United States Patent
Venkatsuresh et al.

(10) Patent No.: US 9,876,613 B2
(45) Date of Patent: Jan. 23, 2018

(54) TRANSPORT PROTOCOL COMMUNICATIONS REDUCTION

(71) Applicant: QUALCOMM Incorporated, San Diego, CA (US)

(72) Inventors: Ajay Venkatsuresh, San Diego, CA (US); Alok Mitra, San Diego, CA (US); Srinivas Reddy Mudireddy, San Diego, CA (US); Gurvinder Singh Chhabra, San Diego, CA (US); Arnaud Meylan, San Diego, CA (US); Sirin Nitinawarat, San Diego, CA (US); Vaibhav Kumar, Encinitas, CA (US); Sujit Nair, San Diego, CA (US); Nehal Somani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/237,185

(22) Filed: Aug. 15, 2016

(65) Prior Publication Data

US 2017/0063498 A1 Mar. 2, 2017

Related U.S. Application Data

(60) Provisional application No. 62/211,279, filed on Aug. 28, 2015.

(51) Int. Cl.
*H04L 1/16* (2006.01)
*H04L 29/08* (2006.01)
(Continued)

(52) U.S. Cl.
CPC ........ *H04L 1/1635* (2013.01); *H04L 67/1097* (2013.01); *H04L 69/16* (2013.01); *H04L 69/326* (2013.01); *H04B 3/50* (2013.01)

(58) Field of Classification Search
CPC . H04L 1/1635; H04L 67/1097; H04L 69/326; H04L 69/16; H04B 3/50
See application file for complete search history.

(56) References Cited

U.S. PATENT DOCUMENTS 7,826,487 B1 11/2010 Mukerji et al.
7,898,946 B2 3/2011 Lee et al.
(Continued)

OTHER PUBLICATIONS

International Search Report and Written Opinion—PCT/US2016/047223—ISA/EPO—dated Oct. 26, 2016.

*Primary Examiner* — Syed Haider
(74) *Attorney, Agent, or Firm* — Arent Fox, LLP

(57) ABSTRACT

A method, an apparatus, and a computer program product for transport protocol communications processing are provided. The apparatus may be an electronic device. The electronic device receives a transport protocol communications from a sender device. The electronic device generates a plurality of acknowledgments in response to the received transport protocol traffic and stores the plurality of acknowledgments at a first memory. A modem load for a modem of the electronic device is determined. The electronic device identifies the plurality of acknowledgments to identify a subset of the plurality of acknowledgments in response to the determined modem load satisfying a modem load threshold condition. The electronic device moves the subset of acknowledgments from the first memory to a second memory. The electronic device transmits the subset of acknowledgments to the sender device.

30 Claims, 11 Drawing Sheets

(51) Int. Cl.
  *H04L 29/06* (2006.01)
  *H04B 3/50* (2006.01)

(56) References Cited

U.S. PATENT DOCUMENTS

| | | |
|---|---|---|
| 8,244,906 B2 | 8/2012 | Aloni et al. |
| 8,516,069 B1 | 8/2013 | Sebastian |
| 8,660,137 B2 | 2/2014 | Aloni et al. |
| 8,718,096 B2 | 5/2014 | Makineni et al. |
| 8,996,718 B2 | 3/2015 | Biswas |
| 2004/0100979 A1 | 5/2004 | Mandin et al. |
| 2005/0226239 A1 | 10/2005 | Nishida et al. |
| 2006/0067222 A1* | 3/2006 | Endoh .................. H04L 69/163 370/231 |
| 2009/0274139 A1* | 11/2009 | Palanki ................ H04L 1/1854 370/349 |
| 2013/0039173 A1* | 2/2013 | Ehsan ................. H04W 52/146 370/229 |
| 2013/0250765 A1 | 9/2013 | Ehsan et al. |
| 2015/0146614 A1* | 5/2015 | Yu ........................ H04L 5/0032 370/328 |
| 2016/0173394 A1* | 6/2016 | Harvell ................. H04L 47/25 709/203 |

* cited by examiner

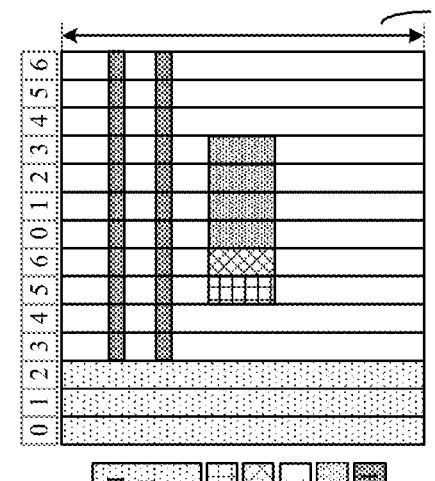
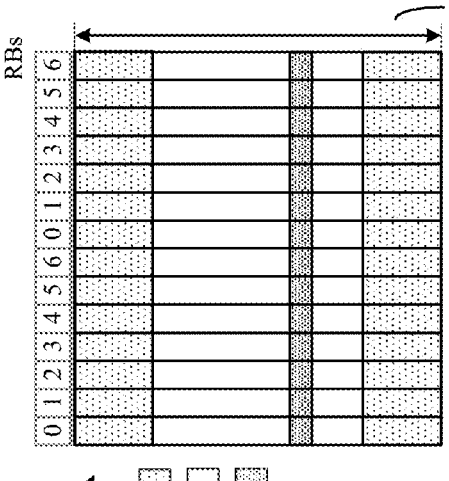
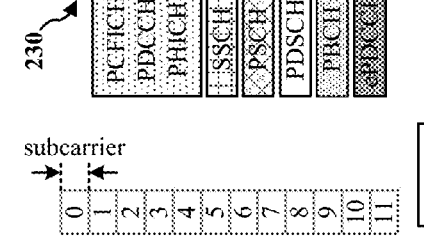
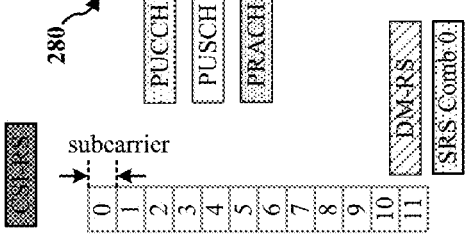
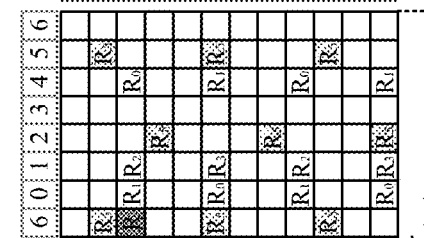
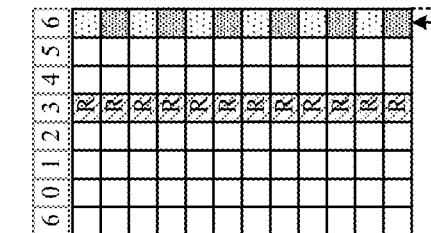
FIG. 2A
FIG. 2B
FIG. 2C
FIG. 2D

TRANSPORT PROTOCOL COMMUNICATIONS REDUCTION

CROSS-REFERENCE TO RELATED APPLICATION(S)

This application claims the benefit of U.S. Provisional Application Ser. No. 62/211,279, entitled "TCP ACKNOWLEDGMENT DECIMATION" and filed on Aug. 28, 2015, which is expressly incorporated by reference herein in its entirety.

BACKGROUND

Field

The present disclosure relates generally to communication systems, and more particularly, to improving processing of transport protocol communications.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In computer networking, a transport protocol or transport layer provides end-to-end or host-to-host communication services for applications within a layered architecture of network components and protocols. The Transmission Control Protocol (TCP) is an implementation of transport protocol that provides the functional and procedural means of transferring data sequences from a source to a destination host via one or more networks, while maintaining the quality of service. TCP is usually built on top of the Internet Protocol (IP). TCP provides reliable, ordered, and error-checked delivery of a data stream between applications running on hosts communicating over an IP network. TCP provides the acknowledgement (ACK) of the successful data transmission and sends the next data when it knows that a sufficient portion of previously sent data has been received. In addition to providing reliable end-to-end transfer through an acknowledgment mechanism, error control and retransmission, TCP also implements flow control algorithm. The transmission medium of TCP may be wire lines and/or wireless links. The wireless link for TCP may use Long-Term Evolution (LTE) standard. Applications that do not require reliable data stream service may use the User Datagram Protocol (UDP), which provides a connectionless datagram service that emphasizes reduced latency over reliability.

The central processing unit (CPU) or hardware cost in terms of processing overhead for TCP traffic relative to UDP traffic increases at higher data rates because the TCP traffic generates multiple TCP acknowledgments (e.g., small IP Frames) in the reverse direction of data communication. The cost of processing these TCP acknowledgments becomes a dominant cost at higher data transfer rates since the processing cost scales with the number of IP frames processed in the higher-layers of the protocol stack and this cost scales with the data transfer rates on the reverse direction of data communication. As the rate of data transfer for chipsets becomes faster and faster, provisioning the CPU and/or memory to accommodate the cost of processing the ever increasing number of TCP acknowledgments would make the chipsets expensive.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

It is desirable to reduce the overhead of processing TCP acknowledgments at high data transfer rate. In an aspect of the disclosure, a method, a computer program product, and an apparatus for transport protocol traffic processing are provided. The apparatus may be an electronic device. The electronic device receives a transport protocol traffic from a sender device. The electronic device generates a plurality of acknowledgments in response to the received transport protocol traffic and stores the plurality of acknowledgments at a first memory. A modem load for a modem of the electronic device is determined. The electronic device identifies a subset of the plurality of acknowledgments in response to the determined modem load satisfying a modem load threshold condition. The electronic device moves the subset of acknowledgments from the first memory to a second memory. The electronic device transmits the subset of acknowledgments to the sender device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
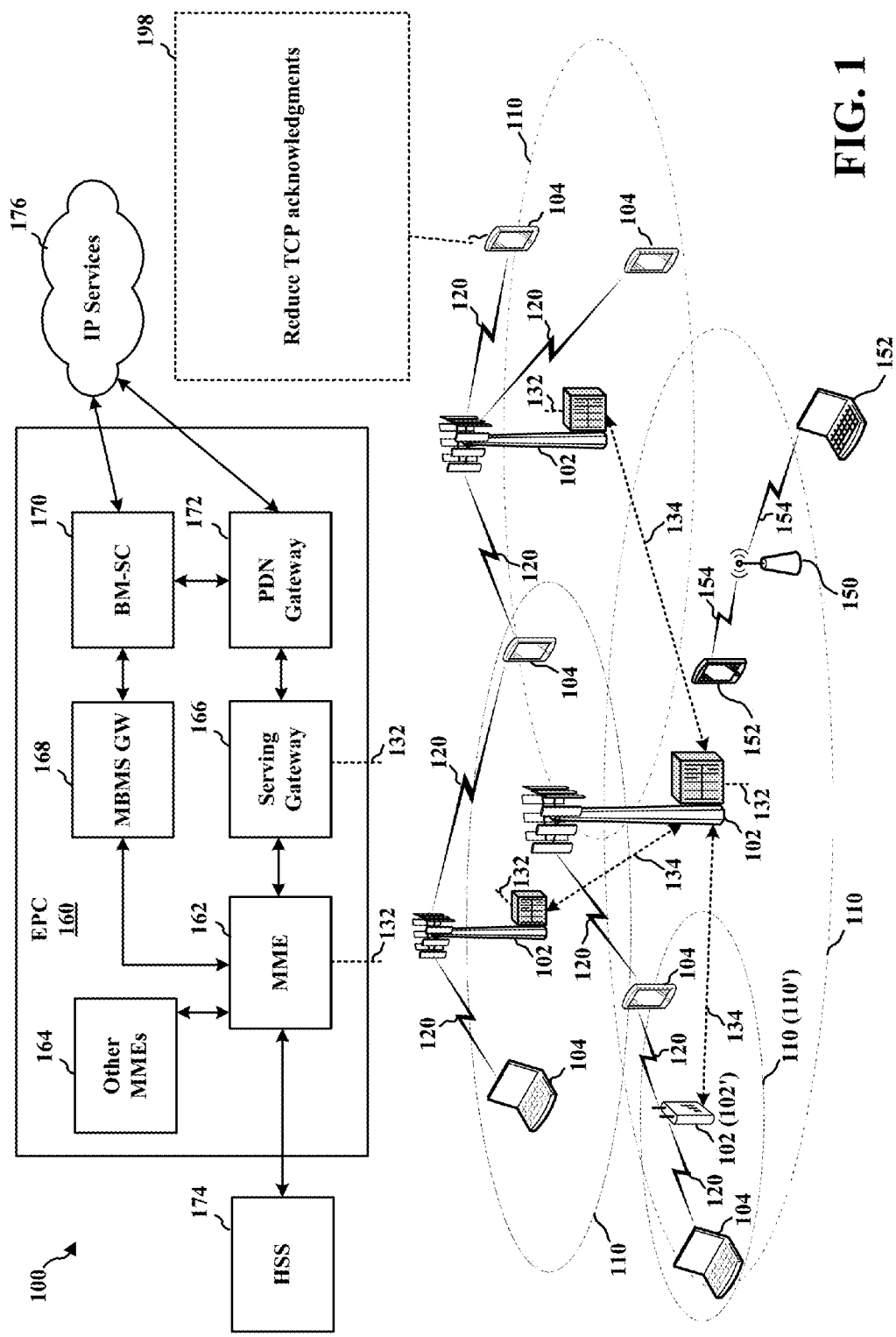
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to reduce (e.g., decimate) (198) TCP acknowledgments. The operations performed at 198 will be further described below with references to FIGS. 4-11.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as R5), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
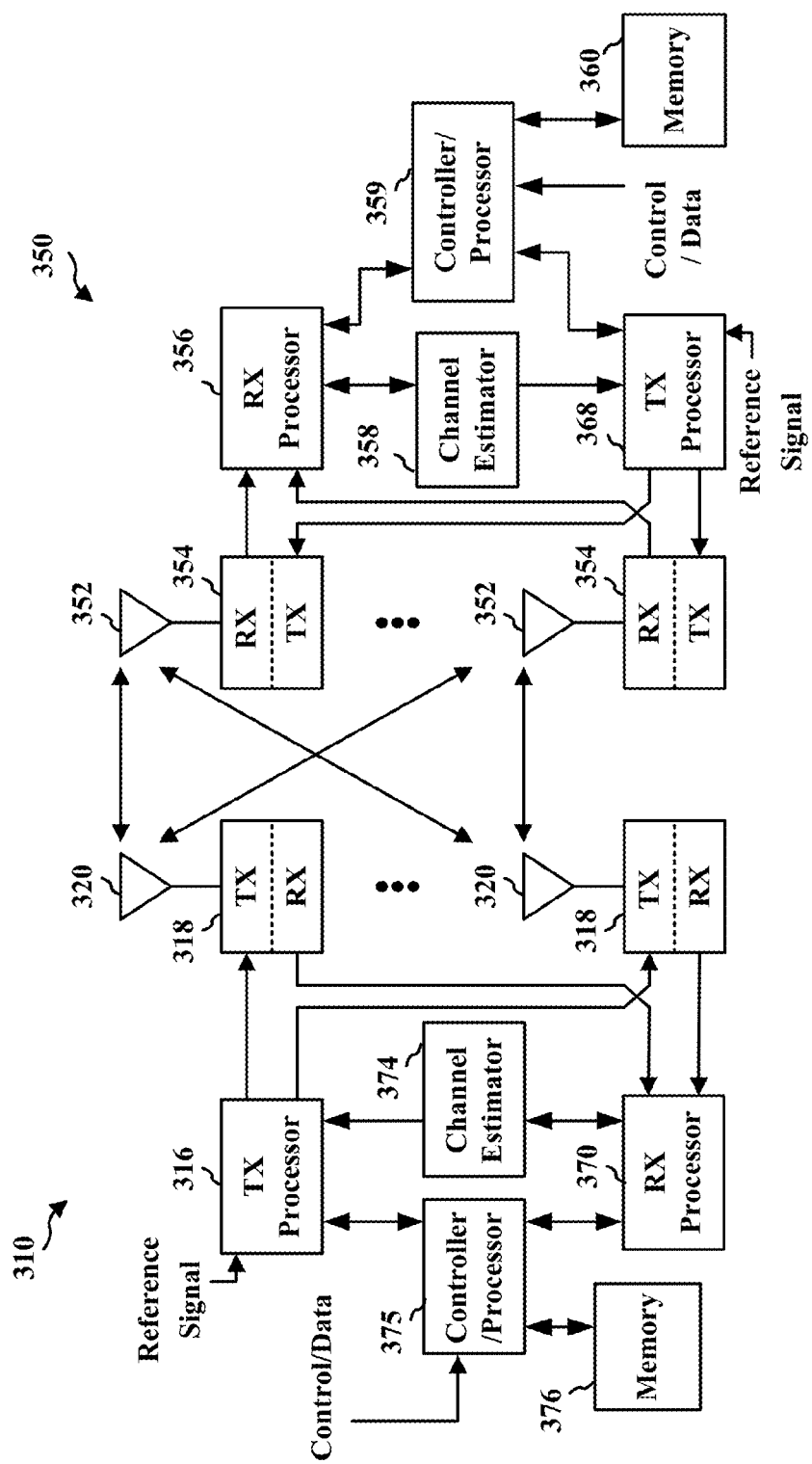
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

TCP data communication may use the technology described above with regard to FIGS. 1-3. Traditionally, an acknowledgment is transmitted for every packet received. TCP uses a cumulative acknowledgment scheme, where the receiver sends an acknowledgment with a sequence number indicating that the receiver has received all data preceding the acknowledged sequence number. Since TCP acknowledgment mechanism is cumulative, some acknowledgments are superfluous and can be dropped without affecting the reliability of the TCP traffic. In one configuration, the modem load for processing TCP acknowledgments may be reduced (e.g., greatly reduced) by transmitting a single acknowledgment for every N number of unique acknowledgments generated for each TCP stream. This cost reduction allows for sizing the chipset for higher data rates at lower cost than would be incurred with the traditional implementation of TCP acknowledgment. This approach also avoids a dedicated hardware block that would lead to higher cost per chipset. In one configuration, the modem load may refer to the modem processor work load.

Figure 4:
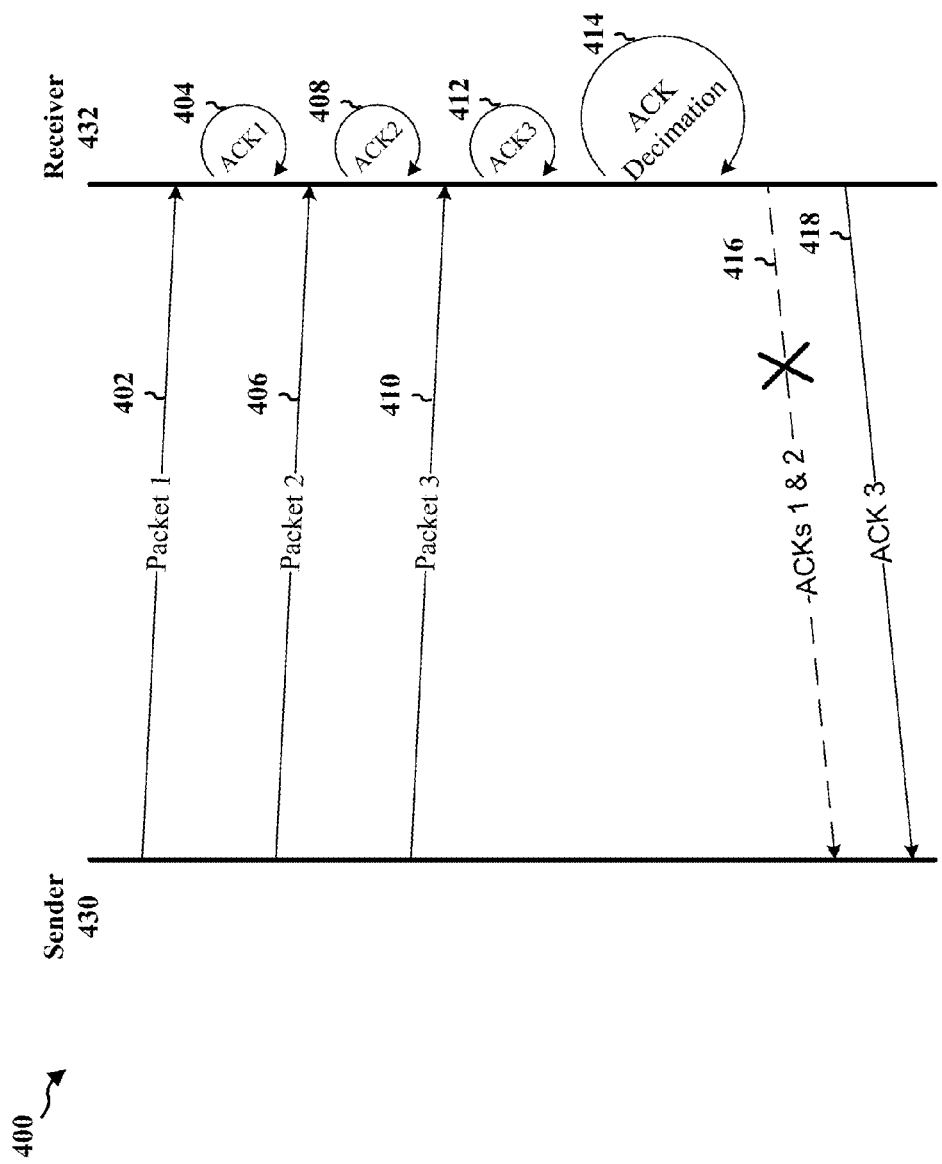
FIG. 4 is a diagram illustrating an example of reducing (e.g., decimating) acknowledgments for TCP data communication between two devices.

FIG. 4 is a diagram 400 illustrating an example of reducing (e.g., decimating) acknowledgments for TCP data communication between two devices. As illustrated in diagram 400, a sender electronic device 430 may send a series of packets to a receiver electronic device 432. Each of the electronic devices 430 and 432 may be a mainframe computer, an embedded computer, a desktop computer, a laptop computer, or any other suitable electronic device. Each of the electronic devices 430 and 432 may also be a mobile computing device, which may be a smart phone, a tablet computer, a smart watch, a head-mounted display, a portable media player, a personal navigation device, a wearable device, a digital camera/camcorder, or any other suitable mobile computing device. Each of the electronic devices 430 and 432 may also be referred to as a mobile device, a mobile station, a user equipment (UE), a subscriber station, a mobile unit, a subscriber unit, a wireless unit, a remote unit, a wireless device, a wireless communications device, a remote device, a mobile subscriber station, an access terminal, a mobile terminal, a wireless terminal, a remote terminal, a handset, a user agent, a mobile client, a client, or some other suitable terminology.

As shown in diagram 400, the sender 430 sends (at 402) packet 1 to the receiver 432. In response to receiving packet 1, the receiver 432 generates (at 404) ACK 1. At 406, the sender 430 sends packet 2 to the receiver 432. In response to receiving packet 2, the receiver 432 generates (at 408) ACK 2. In one configuration, acknowledgment is not generated for every received packet. For example, in diagram 400, ACK 2 may be generated, whereas ACK 1 may not be. This is possible because all TCP acknowledgments may be cumulative. All acknowledgments may cumulatively acknowledge reception of all packets up to the indicated sequence number. This mechanism may be referred to as TCP delayed acknowledgments, wherein TCP intentionally delays sending some acknowledgments (e.g., and possibly suppresses them) in anticipation of sending the subsequent acknowledgments which would render sending the delayed acknowledgments superfluous. At 410, the sender 430 sends packet 3 to the receiver 432. In response to receiving packet 3, the receiver 432 generates (at 412) ACK 3. After generating ACKs 1-3, the receiver 432 reduces (e.g., decimates) (at 414) ACKS 1 and 2. As a result of the reduction, only ACK 3 is transmitted (at 418) to the sender 430 to acknowledge the reception of packets 1-3, while ACKs 1 and 2 are not transmitted (at 416) to the sender 430. In one configuration, ACKS 1 and 2 may be discarded without being sent to the sender 430.

Therefore, instead of sending three acknowledgments regarding three received packets to the sender 430 separately, the receiver 432 sends only one acknowledgment to the sender 430 to acknowledge the reception of all three packets. This greatly reduces the cost for processing TCP acknowledgments in the modem of the receiver 432, while maintaining the reliability of the TCP traffic. In aspects, ACK 3 and at least one of ACK 1 and 2 may be unique ACKs.

Figure 5:
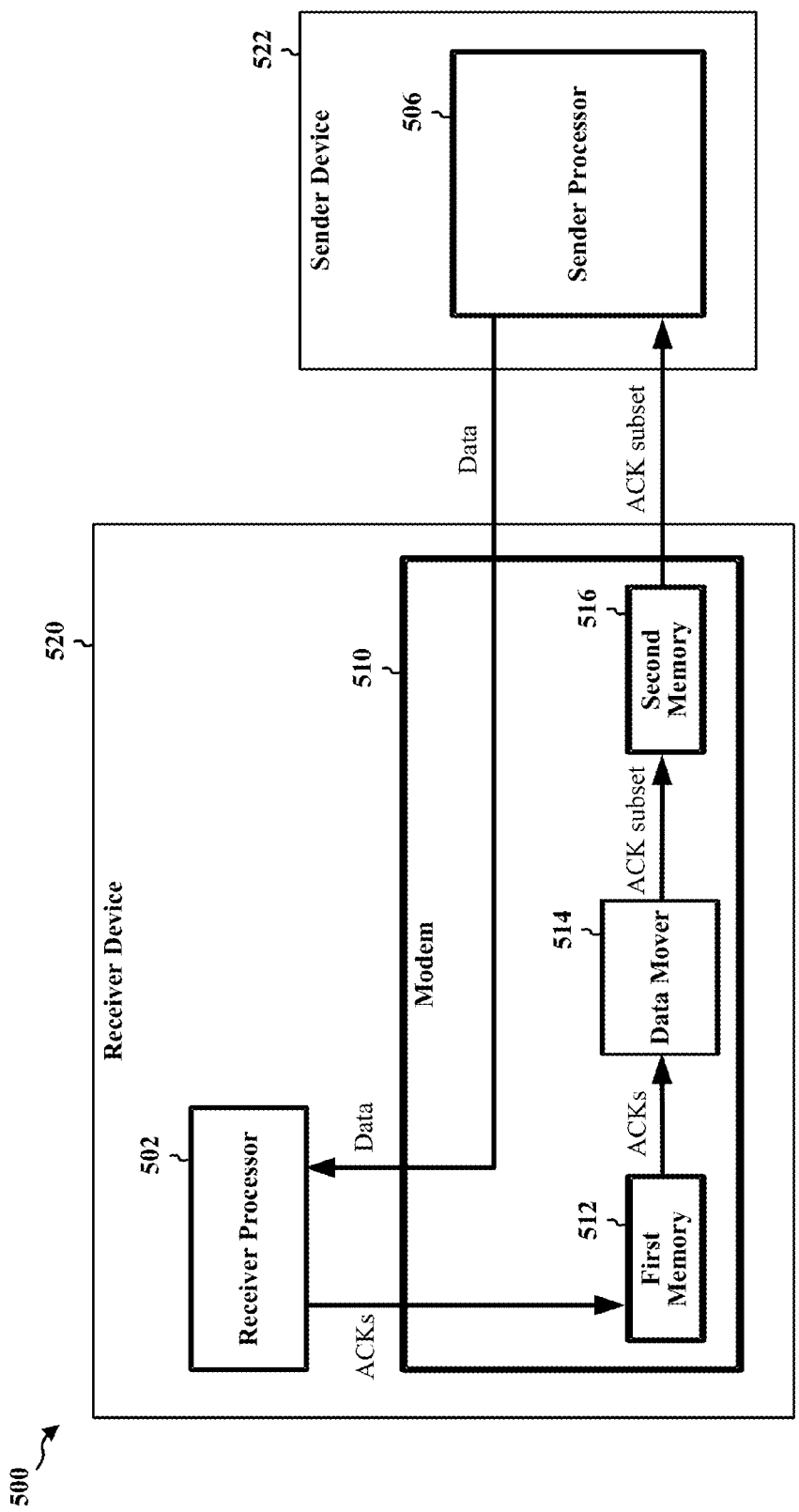
FIG. 5 is a component diagram illustrating an example of TCP acknowledgment reduction (e.g., decimation).

FIG. 5 is a component diagram 500 illustrating an example of TCP acknowledgment reduction (e.g., decimation). As illustrated in diagram 500, a sender processor 506 of a sender electronic device 522 sends data packets to a receiver processor 502 of a receiver electronic device 520. The sender processor 506 may be an application processor that handles tasks related to one or more applications running on the sender electronic device 522. The receiver processor 502 may be an application processor that handles tasks related to one or more applications running on the receiver electronic device 520. In one configuration, the receiver processor 502 may operate the TCP protocol. The receiver device 520 also includes a modem 510. The modem 510 may include a first memory 512, a data mover 514, and a second memory 516.

The data packets are received at the receiver electronic device 520 through the modem 510. In response to the reception of the data packets, the receiver processor 502 or the modem 510 may generate TCP acknowledgments for the received data packets. The generated TCP acknowledgments may be stored at the first memory 512. The first memory 512 may be a physical or logical memory that is associated with the modem 510. In one configuration, the first memory 512 is part of the modem 510. In another configuration, the first memory 512 is outside the modem 510.

The data mover 514 may transfer all TCP acknowledgments stored at the first memory 512 to the second memory 516. In one configuration, under certain conditions, the data mover 514 may identify a subset of the TCP acknowledgments stored at the first memory 512 and move the subset of TCP acknowledgments to the second memory 516 thereby reducing (e.g., decimating) the TCP acknowledgements. In one configuration, the subset of TCP acknowledgments may be a proper subset of the TCP acknowledgments stored at the first memory 512. By moving only a subset of the TCP acknowledgments to the second memory 516, modem memory space (e.g., memory space of the second memory 516) may be saved, thus reducing modem overhead and cost. In another configuration, all the TCP acknowledgments stored at the first memory 512 may be moved to the second memory 516 by the data mover 514.

In one configuration, TCP acknowledgment reduction may be performed for every interval of a fixed sized (e.g., every 1 ms). In such configuration, the data mover 514 may operate on a batch of acknowledgments when performing TCP acknowledgment reduction.

In one configuration, the data mover 514 may perform TCP acknowledgment reduction when the acknowledgment rate is high (e.g., the number of acknowledgments in the current interval being greater than a threshold acknowledgment count) and/or when the modem processor work load is high (e.g., modem load being great than a threshold modem load). In one configuration, the threshold acknowledgment count may be dependent on the (LTE radio) category of the receiver electronic device 520. The faster the receiver electronic device 520 is (e.g., the greater the category), the greater the threshold acknowledgment count may be set. Reduction when the acknowledgement rate is low (e.g., in the slow start phase of TCP flow control) may unnecessarily slow down the data transfer. In one configuration, in conjunction with or instead of acknowledgment rate or modem load, the data mover 514 may perform TCP acknowledgment reduction when memory utilization of the receiver electronic device 520 is high (e.g., memory utilization satisfies a memory utilization threshold condition, for instance, by exceeding a defined memory utilization amount or by meeting or exceeding a defined memory utilization amount), when data transmission rate is high (e.g., data transmission rate being greater than a threshold data rate or being greater than or equal to a threshold data rate), and/or when the thermal status of the receiver electronic device 520 reaches a certain level (e.g., the temperature of one or more parts of the receiver electronic device 520 being greater than a threshold temperature or being greater than or equal to a threshold temperature). Acknowledgment reduction may be invoked when the capacity of the link bearing the TCP acknowledgments is low, to avoid the situation of TCP throughput being limited by the rate at which TCP acknowledgments can be delivered.

In one configuration, instead of comparing the number of acknowledgments in the current interval to the threshold acknowledgment count, the data mover 514 may compare the number of acknowledgments in a previous interval to the threshold acknowledgment count in order to determine whether to perform TCP acknowledgment reduction. This method allows the modem to know at the beginning of an interval (without waiting for the end of the interval) whether packets shall be moved to the second memory (e.g., reduction not active) or are identified for reduction, which avoids moving all the acknowledgment packets to the second memory. In one configuration, instead of counting acknowledgments per TCP flow (e.g., per TCP connection which can be identified by the sender IP address and sender port number and receiver IP address and receiver port number), the data mover 514 may count acknowledgments across all TCP flows served by the modem in order to determine whether to perform TCP acknowledgment reduction.

Duplicate acknowledgment refers to several TCP acknowledgment packets acknowledging the same sequence number. Multiple duplicate acknowledgments may be used by the TCP sender (e.g., the sender device 522) to control the rate of data transmission and may signal the end of a congestion. In order to keep the TCP rate control un-affected by this technique, in one configuration, the data mover 514 transfers all duplicate acknowledgments from the first memory 512 to the second memory 516 without performing TCP acknowledgment reduction. Multiple duplicate acknowledgments may be used by the receiver device 520 to signal a gap in the packets it receives and trigger a fast retransmission at the sender side (e.g., the sender device 522), which may enhance data transfer rate in presence of packet loss. In order to maintain the enhanced data transfer rate introduced by using multiple duplicate acknowledgments, in one configuration, the data mover 514 transfers all duplicate acknowledgments from the first memory 512 to the second memory 516 without performing TCP acknowledgment reduction.

The second memory 516 may be a physical or logical memory that is associated with the modem 510. In one configuration, the second memory 516 may be part of the modem 510. In another configuration, the second memory 516 may be outside the modem 510. In one configuration, the first memory 512 and the second memory 516 may be two physically or logically separated memories. The modem 510 may send the TCP acknowledgments stored at the second memory 516 (e.g., the subset of TCP acknowledgments) over the link layer to the sender processor 506 to acknowledge data packets received from the sender device 522.

In one configuration, the data mover 514 performs TCP acknowledgment reduction based on a reduction factor N. In one configuration, the number of unique TCP acknowledgments moved to the second memory 516 (e.g., the number of unique TCP acknowledgments in the subset of TCP acknowledgments) is equal to the number of unique TCP acknowledgments stored at the first memory 512 divided by the reduction factor N. For example, for 20 unique TCP acknowledgments stored at the first memory 512, reduction factor N=5 entails transferring four unique TCP acknowledgments to the second memory 516, while discarding the other 16 unique TCP acknowledgments. In one configuration, the number of unique TCP acknowledgments stored at the first memory 512 does not include the number of duplicate acknowledgments stored at the first memory 512.

Figure 6:
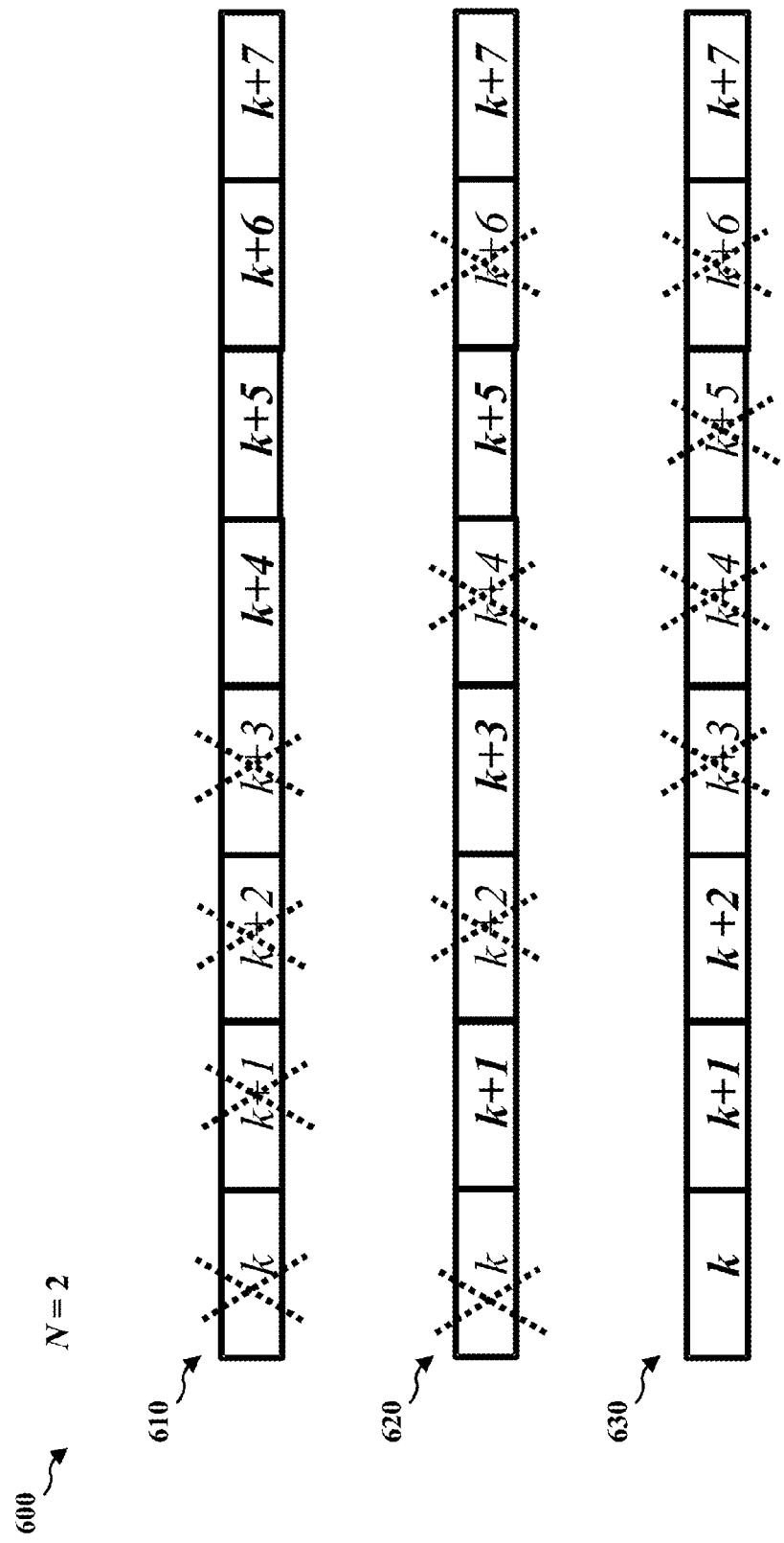
FIG. 6 is a diagram illustrating several examples of TCP acknowledgment reduction implementation.

FIG. 6 is a diagram 600 illustrating several examples of TCP acknowledgment reduction (e.g., decimation) implementation. Specifically, diagram 600 shows three different implementations 610, 620, and 630 of TCP acknowledgment reduction when the reduction factor N equals to 2. As shown, for each implementation, there are originally eight unique TCP acknowledgments (ACK k, ACK k+1 . . . ACK k+7) generated (e.g., stored at the first memory 512) in response to the received TCP traffic within a fixed interval. Because the reduction factor N is 2, only four unique TCP acknowledgments may be transmitted to the sender to acknowledge the reception of the TCP traffic within the interval, and the other four unique TCP acknowledgments may be reduced. In one configuration, the reduced TCP acknowledgments may be discarded without being transmitted to the sender.

In the first implementation 610, only the unique TCP acknowledgments with the highest sequence number in the interval are transmitted to the sender, and the unique TCP acknowledgments with the lowest sequence numbers are reduced. The unique TCP acknowledgments with the highest sequence number are the unique TCP acknowledgments that are generated to acknowledge the latest transmitted packets. As shown in the first implementation 610, ACK k, ACK k+1, ACK k+2, and ACK k+3 are decimated, while ACK k+4, ACK k+5, ACK k+6, and ACK k+7 are transmitted to the sender.

In the second implementation 620, to achieve reduction factor N, only one unique TCP acknowledgment (e.g., the one with the highest sequence number) in every N unique TCP acknowledgments may be transmitted to the sender, and the other unique TCP acknowledgments are reduced. As shown in the second implementation 620, ACK k, ACK k+2, ACK k+4, and ACK k+6 are reduced, while ACK k+1, ACK k+3, ACK k+5, and ACK k+7 are transmitted to the sender. The second implementation 620 allows reduction to be implemented in one pass.

In the third implementation 630, the earliest unique TCP acknowledgments (e.g., the ones with the lowest sequence numbers) in the interval and the last unique TCP acknowledgment (e.g., the one with the highest sequence number) in the interval may be transmitted to the sender, and the other unique TCP acknowledgments are reduced. The third implementation 630 may get the highest data rate in TCP slow start, where the sending data rate increase exponentially with every acknowledgment received (thus earlier acknowledgments are more important for increasing the sending rate). The third implementation 630 may achieve lower round-trip time for data transmission. As shown in the third implementation 630, ACK k+3, ACK k+4, ACK k+5, and ACK k+6 are reduced, while ACK k, ACK k+1, ACK k+2, and ACK k+7 are transmitted to the sender.

Figure 7:
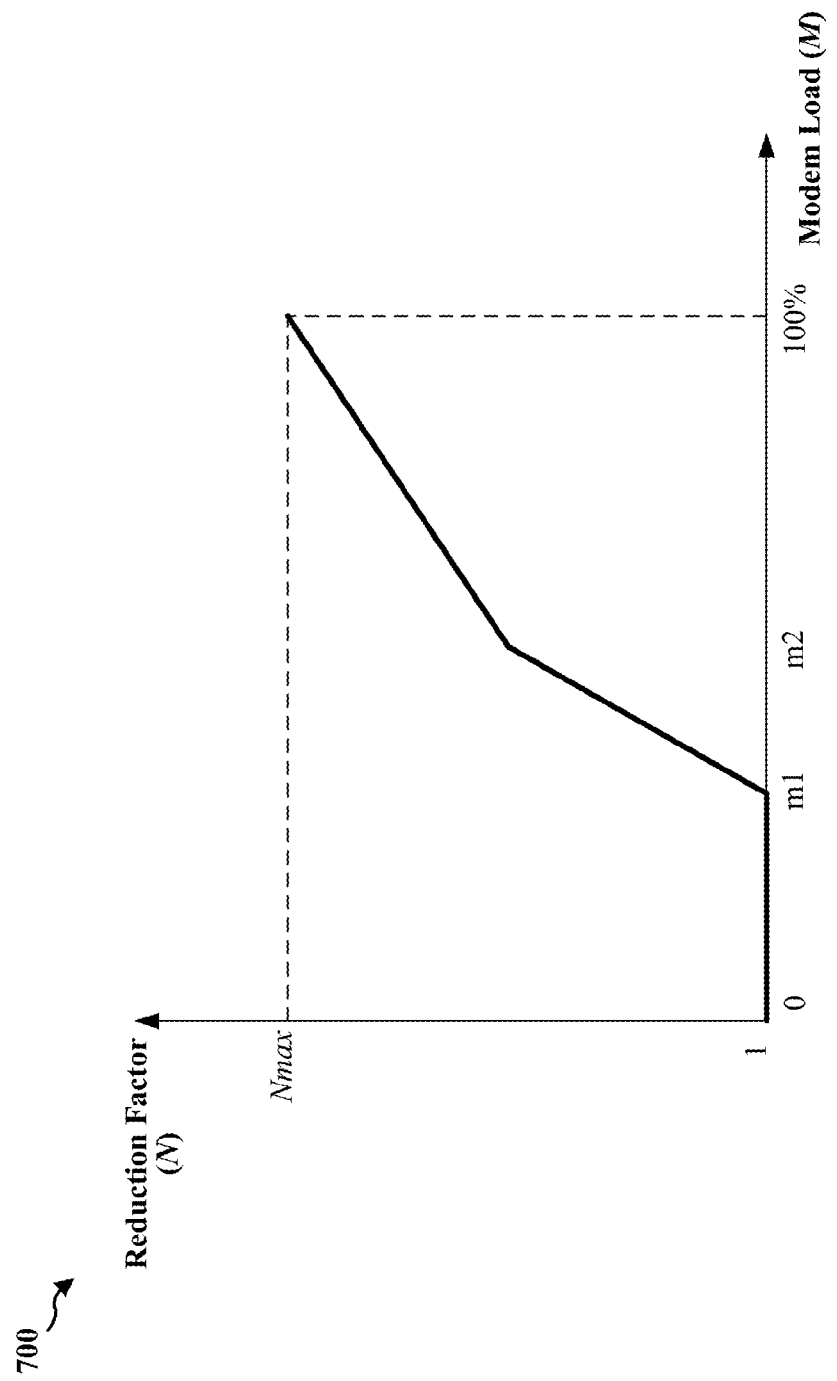
FIG. 7 is a diagram illustrating the relationship between the value of reduction factor and the modem load.

In one configuration, the reduction factor N may be adaptively adjusted based on the modem (processor) load of the receiver device. In one configuration, the modem load may be measured by the load of a modem processor (e.g., a processor dedicated to the modem). FIG. 7 is a diagram 700 illustrating the relationship between the value of reduction factor N and the modem load M. In one configuration, the modem load M may be a usage percentage of the modem, where a modem load M of 100% represents that the modem is fully utilized. As shown in diagram 700, the reduction factor N can be dynamically adjusted based on the modem load M. In particular, the reduction factor N is equals to 1 when the modem load M is relatively low, e.g., below a certain percentage mi. When the modem load M exceeds the percentage mi, the reduction factor N may be increased accordingly. In general, the greater the modem load M, the greater the reduction factor N. When the modem load M is at 100%, the reduction factor N may be set at the maximum reduction factor $N_{max}$. In one configuration, in conjunction with or instead of modem load, the reduction factor N may be dynamically adjusted based on at least one of the number of acknowledgments present in the time interval per flow or across all flows, TCP memory utilization, thermal status, or capacity of the link transporting the TCP acknowledgments.

Figure 8:
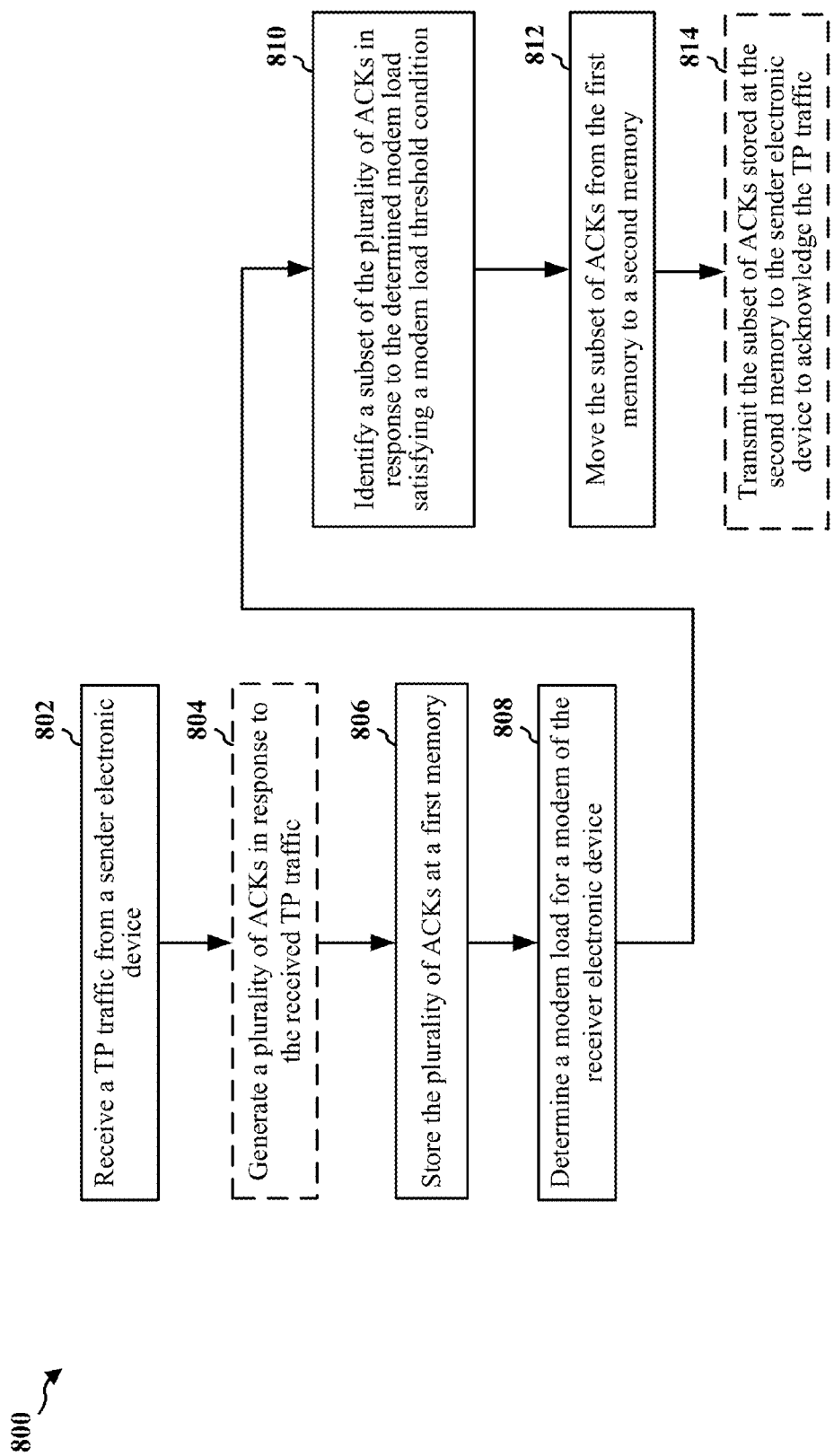
FIG. 8 is a flowchart of a method for transport protocol acknowledgment reduction of an electronic device.

FIG. 8 is a flowchart 800 of a method for transport protocol acknowledgment reduction (e.g., decimation) of an electronic device. In one configuration, the transport protocol may be TCP. The method may be performed by a receiver electronic device (e.g., the receiver electronic device 432, 520, or the apparatus 1002/1002'). In one configuration, the receiver electronic device may be a UE. In one configuration, the receiver electronic device may be a modem. At 802, the receiver electronic device receives a transport protocol traffic from a sender electronic device (e.g., the sender electronic device 430 or 522). The transport protocol traffic may arrive within a fixed time interval and may include several packets (e.g., packets 1-3 described above with respect to FIG. 4). In one configuration, the transport protocol traffic may include one or more transport protocol connections/streams.

At 804, the receiver electronic device may optionally generate a plurality of transport protocol acknowledgments in response to the received transport protocol traffic. In one configuration, the plurality of acknowledgments may all be unique acknowledgments. In one configuration, the plurality of acknowledgments may include unique acknowledgments and duplicate acknowledgments. In one configuration, the plurality of acknowledgments may be generated by an application processor (e.g., the receiver processor 502) or by a modem (e.g., the modem 510). In one configuration, one acknowledgment may be generated for each received packet. In another configuration, one acknowledgment may be generated for a plurality of received packets.

At 806, the receiver electronic device stores the plurality of acknowledgments at a first memory (e.g., the first memory 512). In one configuration, the first memory may be associated with the application processor (e.g., the receiver processor 502). In another configuration, the first memory may be associated with the modem (e.g., the modem 510).

At 808, the receiver electronic device determines a modem load for a modem (e.g., the modem 510). In one configuration, the modem load may be a usage percentage of the modem, where a modem load of 100% represents that the modem is fully utilized.

At 810, the receiver electronic device identifies a subset of the plurality of acknowledgments in response to the determined modem load, which was determined at 808, satisfying a modem load threshold condition. In some embodiments, the determined modem load may satisfy the modem load threshold condition by exceeding a defined modem load amount. In some embodiments, the determined modem load may satisfy the modem load threshold condition by meeting or exceeding a defined modem load amount.

In one configuration, all duplicate acknowledgments within the plurality of acknowledgments stored at the first memory are included in the subset of acknowledgments. In other words, all duplicate acknowledgments are not reduced (e.g., decimated). By avoid reducing duplicate acknowledgments, the rate control and/or fast retransmission mechanism facilitated by duplicate acknowledgments may be preserved.

At 812, the receiver electronic device moves the subset of acknowledgments from the first memory to a second memory (e.g., the second memory 516). In one configuration, the second memory may be associated with the modem. By moving a subset of acknowledgments to the second memory, modem memory space may be saved, thus reducing modem overhead and cost. In this manner, TCP acknowledgements may be reduced. In one configuration, the operations at 810 and 812 are performed by the data mover 514 described above with regard to FIG. 5. In aspects, the identifying and/or moving of the subset of acknowledgments may be triggered when the modem load is greater than 50%. As another example, the identifying and/or moving of the subset of acknowledgments may be triggered when the modem load is at least 50%. In one configuration, the identifying and/or moving of the subset of acknowledgments may be performed based on a reduction factor N. In such configuration, the number of unique acknowledgments in the subset is equal to the number of unique acknowledgments stored at the first memory divided by the reduction factor N. In one configuration, the reduction factor N may be dynamically adjusted based on at least one of the number of acknowledgments present in the time interval per flow or across all flows, the modem load, transport protocol memory utilization, or thermal status. In one configuration, in conjunction with or instead of modem load, the identifying and/or moving of the subset of acknowledgments may be triggered by one or more of acknowledgment rate, memory utilization, data transmission rate, or thermal status satisfies a respective condition.

At 814, the receiver electronic device may optionally transmit the subset of acknowledgments (e.g., ACK 3 described above with respect to FIG. 4) stored at the second memory to the sender electronic device to acknowledge the received transport protocol traffic.

Figure 9:
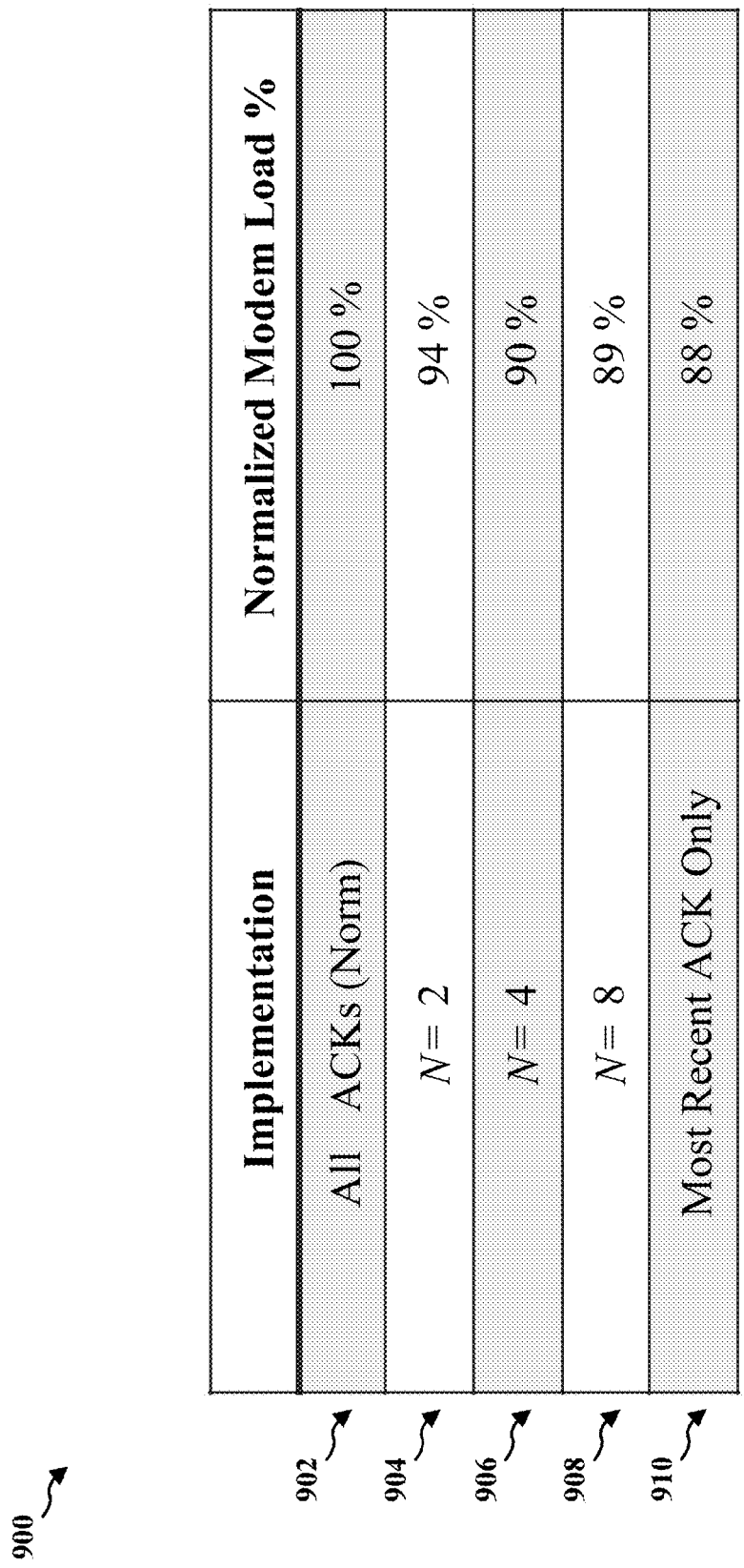
FIG. 9 is a diagram illustrating a comparison of the modem load of a receiver electronic device using different reduction factors for TCP acknowledgment decimation.

FIG. 9 is a diagram 900 illustrating a comparison of the modem (processor) load of a receiver electronic device using different implementations for processing TCP traffic. Specifically, diagram 900 shows how the adoption of TCP acknowledgment reduction (e.g., decimation) may lessen the load of modem processor with regard to the same TCP traffic, thus improving the efficiency of TCP communications processing.

As shown at row 904, when TCP acknowledgment reducing is performed with a reduction factor of 2, the modem load of the receiver electronic device is lowered to 94% as compared to the case in which all acknowledgements are sent at row 902. At row 906, when TCP acknowledgment reducing is performed with a reduction factor of 4, the modem load of the receiver electronic device is further lowered to 90%. At row 908, when TCP acknowledgment reduction is performed with a reduction factor of 8, the modem load of the receiver electronic device is further lowered to 89%. At row 910, when TCP acknowledgment reduction is performed with the most recent acknowledgment in an interval being acknowledged only, the modem load of the receiver electronic device is lowered to 88%.

As shown in diagram 900, the implementation of TCP acknowledgment reduction against the same TCP traffic reduces modem load, thus improving the efficiency of TCP communications processing. It is also shown that the greater the reduction factor, the greater amount of modem load may be reduced.

Figure 10:
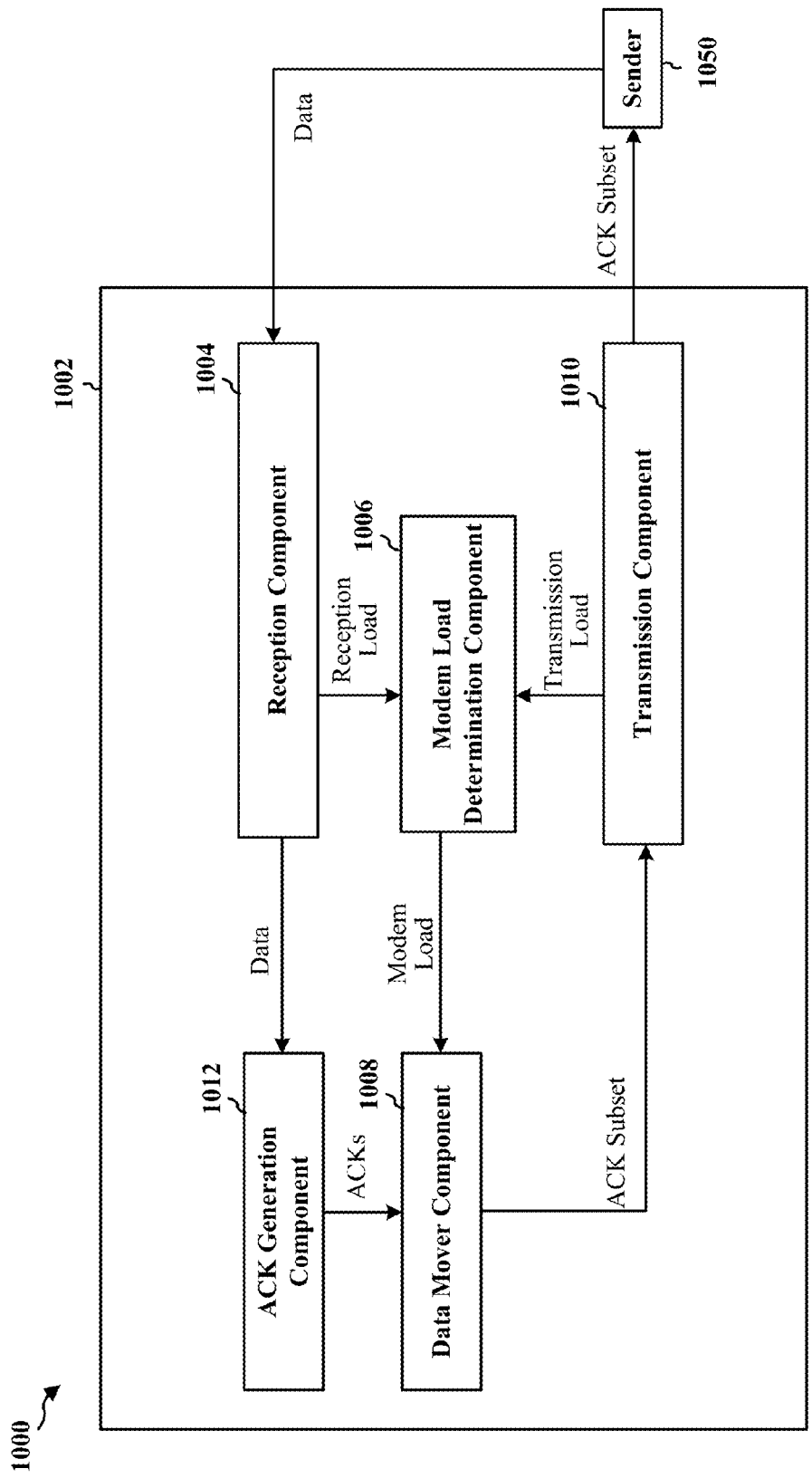
FIG. 10 is a conceptual data flow diagram illustrating the flow between different modules/means/components in an exemplary apparatus that implements the method of FIG. 8.

FIG. 10 is a conceptual data flow diagram 1000 illustrating the data flow between different means/components in an exemplary apparatus 1002 configured to implement the method of FIG. 8. The apparatus 1002 may be a receiver electronic device (e.g., the receiver electronic device 432 or 520). In one configuration, the apparatus may be a UE. The apparatus 1002 may include a reception component 1004, a modem load determination component 1006, a data mover component 1008, a transmission component 1010, and an acknowledgment generation component 1012.

The reception component 1004 receives TCP traffic/data from a sender 1050 (e.g., the sender electronic device 130 or 522). In one configuration, the reception component 1004 may be part of the modem (e.g., the modem 510). The reception component 1004 sends the received TCP traffic/data to the acknowledgment generation component 1012. In one configuration, the reception component 1004 may send a reception load to the modem load determination component 1006. In one configuration, the reception component 1004 performs the operations described above with reference to 802 of FIG. 8.

The transmission component 1010 receives a subset of TCP acknowledgments from the data mover component 1008 and transmits the subset of TCP acknowledgments to the sender 1050. In one configuration, the transmission component 1010 may be part of the modem (e.g., the modem 510). In one configuration, the transmission component 1010 may include a memory (e.g., the second memory 516) that stores the subset of TCP acknowledgments. In one configuration, the transmission component 1010 may send a transmission load to the modem load determination component 1006. In one configuration, the transmission component 1010 performs the operations described above with reference to 814 of FIG. 8.

The acknowledgment generation component 1012 generates several TCP acknowledgments based on the TCP traffic/data received from the reception component 1004. In one configuration, the acknowledgment generation component 1012 may be part of an application processor (e.g., the receiver processor 502). In another configuration, the acknowledgment generation component 1012 may be part of the modem (e.g., the modem 510). In one configuration, the acknowledgment generation component 1012 may include a memory (e.g., the first memory 512) that stores the generated TCP acknowledgments. In one configuration, the acknowledgment generation component 1012 generates one TCP acknowledgment for each received packet. In another configuration, the acknowledgment generation component 1012 generates one acknowledgment for a plurality of received packets. In one configuration, the acknowledgment generation component 1012 performs the operations described above with reference to 804 and 806 of FIG. 8.

The modem load determination component 1006 specifies the current modem load of the apparatus 1002 and sends the modem load to the data mover component 1008. In one configuration, the modem load determination component 1006 determines the modem load based on the reception load received from the reception component 1004 and the transmission load received from the transmission component 1010. In one configuration, the modem load determination component 1006 is part of the modem (e.g., the modem 510). In one configuration, the modem load determination component 1006 performs the operations described above with reference to 808 of FIG. 8.

When the modem load provided by the modem load determination component 1006 exceeds a modem load threshold, the data mover component 1008 may identify the subset of the TCP acknowledgments received from the acknowledgment generation component 1012. The subset of TCP acknowledgments are sent to the transmission component 1010 thereby reducing (e.g., decimating) the TCP acknowledgements. In one configuration, the data mover component 1008 moves the subset of TCP acknowledgments from a first memory (e.g., the first memory 512) to a second memory (e.g., the second memory 516). In one configuration, in conjunction with or instead of modem load, the TCP acknowledgments reduction may be triggered by one or more of acknowledgment rate, memory utilization, data transmission rate, thermal status, or capacity of the link transporting the TCP acknowledgments satisfies a respective condition. In one configuration, the data mover component 1008 performs the operations described above with reference to 810 and 812 of FIG. 8.

Figure 11:
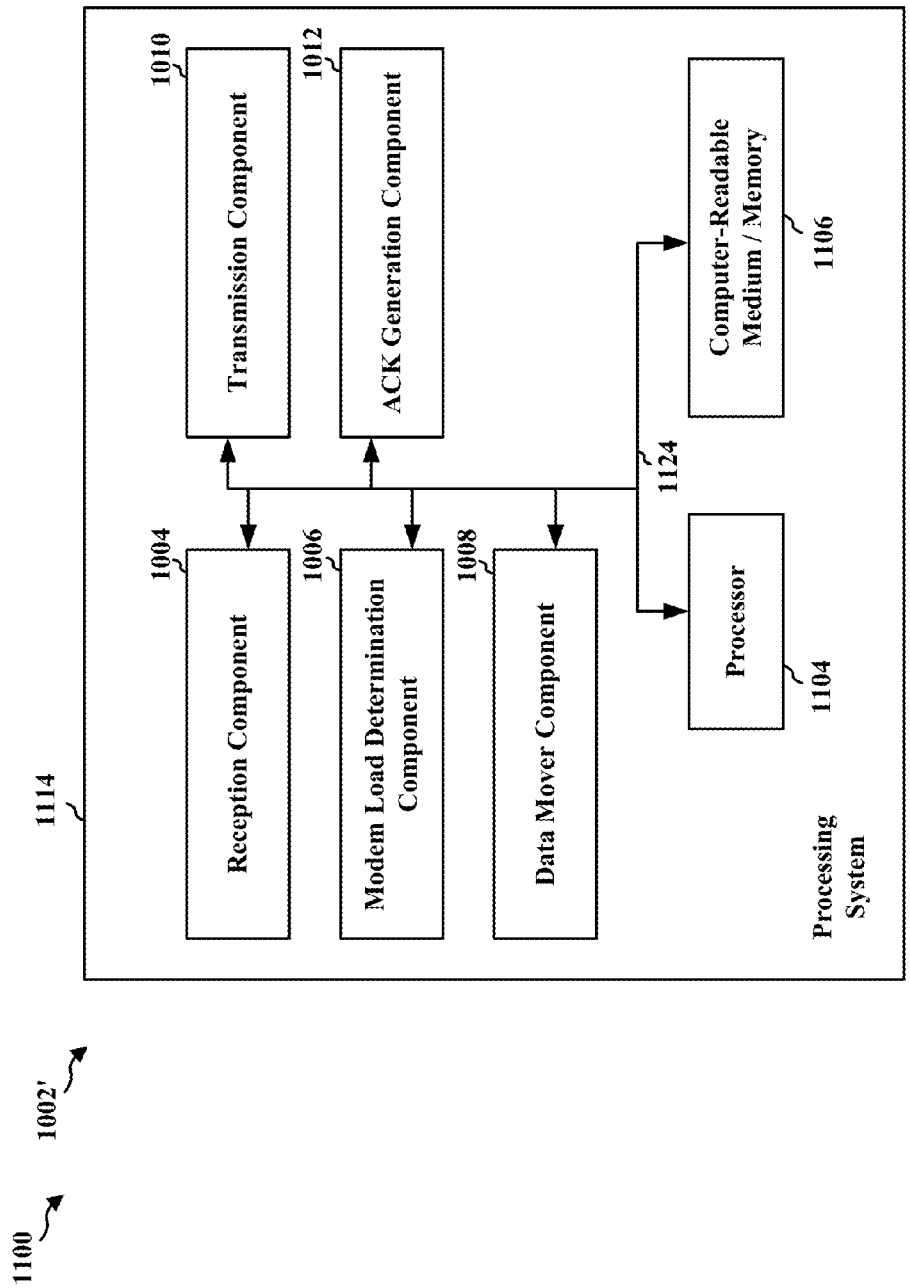
FIG. 11 is a diagram illustrating an example of a hardware implementation for an apparatus employing a processing system that implements the method of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof FIG. 11 is a diagram 1100 illustrating an example of a hardware implementation for an apparatus 1002' employing a processing system 1114 that implements the method of FIG. 8. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for TCP traffic processing includes means for receiving a TCP traffic, means for storing a plurality of acknowledgments at a first memory, means for determining a modem load for a modem, means for identifying a subset of the plurality of acknowledgments, and means for moving the subset of acknowledgments.

In one configuration, the means for receiving a TCP traffic may include the reception component 1004 and/or the processor 1104 configured to receive TCP traffic from a sender electronic device. In one configuration, the means for receiving a TCP traffic may be configured to decode the TCP traffic and recover packets. In one configuration, the means for receiving a TCP traffic may be part of a modem (e.g., the modem 510).

In one configuration, the means for storing a plurality of acknowledgments at a first memory may include the acknowledgment generation component 1012 and/or the processor 1104 configured to generate TCP acknowledgments in response to the received TCP traffic. In one configuration, the means for storing a plurality of acknowledgments at a first memory may be configured to generate a TCP acknowledgment for each received packet. In another configuration, the means for storing a plurality of acknowledgments at a first memory may be configured to generate a TCP acknowledgment for a plurality of received packets. In one configuration, the means for storing a plurality of acknowledgments at a first memory may store the generated TCP acknowledgments at the first memory. In one configuration, the means for storing a plurality of acknowledgments at a first memory may be part of a modem (e.g., the modem 510). In another configuration, the means for storing a plurality of acknowledgments at a first memory may be part of an application processor (e.g., the receiver processor 502).

In one configuration, the means for determining a modem load may include the modem load determination component 1006 and/or the processor 1104 configured to determine the current load of the modem. In one configuration, the means for determining a modem load may be configured to determine the modem load based on the reception load and transmission load. In one configuration, the means for determining a modem load may be part of a modem (e.g., the modem 510).

In one configuration, the means for identifying a subset of the plurality of acknowledgments may include the processor 1104 configured to identify the subset of TCP acknowledgments. In one configuration, the means for identifying a subset of the plurality of acknowledgments may be configured to reduce the plurality of acknowledgments based on a reduction factor N. In one configuration, the means for identifying a subset of the plurality of acknowledgments may be part of a modem (e.g., the modem 510). In one configuration, the means for identifying a subset of the plurality of acknowledgments may be configured to select all duplicate acknowledgments within the plurality of acknowledgments to be included in the subset of acknowledgments.

In one configuration, the means for moving the subset of acknowledgments may include the data mover component 1008 and/or the processor 1104 configured to identify the subset of TCP acknowledgments. In one configuration, the means for moving the subset of acknowledgments may be configured to identify the subset of the plurality of acknowledgments based on a reduction factor N to identify the subset of acknowledgments and copy the subset of acknowledgments from the first memory to the second memory. In one configuration, the means for moving the subset of acknowledgments may be part of a modem (e.g., the modem 510).

In one configuration, the apparatus 1002/1002' may include means for determining a number of acknowledgments present in a time interval. In one configuration, the means for determining a number of acknowledgments present in a time interval may include the processor 1104 configured to count the number of acknowledgments present within a fixed time interval per flow or across all flows. In one configuration, the means for determining a number of acknowledgments present in a time interval may be configured to increase a counter every time an acknowledgment is generated. In one configuration, the means for determining a number of acknowledgments present in a time interval may be part of a modem (e.g., the modem 510).

In one configuration, the apparatus 1002/1002' may include means for determining a memory utilization. In one configuration, the means for determining a memory utilization may include the processor 1104 configured to measure the memory utilization. In one configuration, the means for determining a memory utilization may be configured to measure the percentage of memory being currently used.

In one configuration, the apparatus 1002/1002' may include means for determining a thermal status. In one configuration, the means for determining a thermal status may include the processor 1104 configured to monitor the thermal status. In one configuration, the means for determining a thermal status may be configured to measure the temperature of the apparatus 1002/1002' to determine the thermal status.

In one configuration, the apparatus 1002/1002' may include means for determining the capacity of the link transporting TP acknowledgments. In one configuration, the means for determining the link capacity may include the processor 1104 configured to monitor and estimate the link capacity. In one configuration, the means for determining the link capacity may be configured to measure the signal-to-noise ratio of the link transporting TP acknowledgment from the apparatus 1002/1002' to determine the link capacity.

In one configuration, the apparatus 1002/1002' may include means for generating the plurality of acknowledgments and means for transmitting the subset of acknowledgments. In one configuration, the means for generating the plurality of acknowledgments may include the acknowledgment generation component 1012 and/or the processor 1104 configured to generate TCP acknowledgments in response to the received TCP traffic. In one configuration, the means for generating the plurality of acknowledgments may be configured to generate a TCP acknowledgment for each received packet. In another configuration, the means for generating the plurality of acknowledgments may be configured to generate a TCP acknowledgment for a plurality of received packets. In one configuration, the means for generating the plurality of acknowledgments may be part of a modem (e.g., the modem 510). In another configuration, the means for generating the plurality of acknowledgments may be part of an application processor (e.g., the receiver processor 502).

In one configuration, the means for transmitting the subset of acknowledgments may include the transmission component 1010 and/or the processor 1104 configured to transmit the subset of acknowledgments to the sender. In one configuration, the means for transmitting the subset of acknowledgments may be configured to put each of the subset of acknowledgments into an IP packet and transmit the IP packets to the sender. In one configuration, the means for transmitting the subset of acknowledgments may be part of a modem (e.g., the modem 510).

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of Transport Protocol (TP) communications processing of an electronic device, comprising:
   receiving TP traffic;
   storing a plurality of ACKs at a first memory in response to the received TP traffic;
   determining a modem load for a modem of the electronic device;
   identifying a subset of ACKs of the plurality of ACKs in response to the determined modem load satisfying a modem load threshold condition, wherein a number of unique ACKs to be included in the subset of ACKs is based on a reduction factor N, wherein the reduction factor N is adjusted based on a memory utilization of the electronic device; and
   moving the subset of ACKs from the first memory to a second memory.

2. The method of claim 1, wherein the identifying comprises selecting all duplicate ACKs within the plurality of ACKs to be included in the subset of ACKs.

3. The method of claim 1, wherein the reduction factor N is further adjusted based on at least one of a number of ACKs present in a time interval per flow or across all flows, the modem load, thermal status, or capacity of link carrying the plurality of ACKs.

4. The method of claim 3, wherein the subset of ACKs comprises one ACK for every N unique ACKs of the plurality of ACKs.

5. The method of claim 3, wherein the subset of ACKs comprises a last unique ACK of the plurality of ACKs and a set of earliest unique ACKs of the plurality of ACKs.

6. The method of claim 1 further comprising determining a number of ACKs present in a time interval, wherein the identifying is further in response to the number of ACKs present in the time interval satisfying an ACK count threshold condition.

7. The method of claim 6, wherein the ACK count threshold condition depends on a category of the electronic device.

8. The method of claim 1 further comprising determining the memory utilization of the electronic device, wherein the identifying is further in response to the memory utilization satisfying a memory utilization threshold condition.

9. The method of claim 1 further comprising determining a thermal status of the electronic device, wherein the identifying is further in response to the thermal status satisfying a thermal level threshold condition.

10. The method of claim 1, further comprising determining a capacity of a link transporting the plurality of ACKs, wherein the identifying is further in response to the capacity of the link satisfying a capacity level threshold condition.

11. An apparatus for Transport Protocol (TP) communications processing, comprising:
   means for receiving TP traffic;
   means for storing a plurality of ACKs at a first memory in response to the received TP traffic;
   means for determining a modem load for a modem;
   means for identifying the plurality of ACKs to identify a subset of ACKs of the plurality of ACKs in response to the determined modem load satisfying a modem load threshold condition, wherein a number of unique ACKs to be included in the subset of ACKs is based on a reduction factor N, wherein the reduction factor N is adjusted based on a memory utilization of the apparatus; and
   means for moving the subset of ACKs from the first memory to a second memory.

12. The apparatus of claim 11, wherein the means for identifying is configured to select all duplicate ACKs within the plurality of ACKs to be included in the subset of ACKs.

13. The apparatus of claim 11, wherein the reduction factor N is further adjusted based on at least one of a number of ACKs present in a time interval per flow or across all flows, the modem load, thermal status, or capacity of link carrying the plurality of ACKs.

14. The apparatus of claim 13, wherein the subset of ACKs comprises one ACK for every N unique ACKs of the plurality of ACKs.

15. The apparatus of claim 13, wherein the subset of ACKs comprises a last unique ACK of the plurality of ACKs and a set of earliest unique ACKs of the plurality of ACKs.

16. The apparatus of claim 11 further comprising means for determining a number of ACKs present in a time interval, wherein the means for identifying is configured to be further in response to the number of ACKs present in the time interval satisfying an ACK count threshold condition, wherein the ACK count threshold condition depends on a category of the apparatus.

17. The apparatus of claim 11 further comprising means for determining the memory utilization, wherein the means for identifying is configured to be further in response to the memory utilization satisfying a memory utilization threshold condition.

18. The apparatus of claim 11 further comprising means for determining a thermal status, wherein the means for identifying is configured to be further in response to the thermal status satisfying a thermal level threshold condition.

19. The apparatus of claim 11 further comprising means for determining a capacity of a link transporting the plurality of ACKs, wherein the means for identifying is configured to be further in response to the capacity of the link satisfying a capacity level threshold condition.

20. An apparatus for Transport Protocol (TP) communications processing, comprising:
   a memory; and
   at least one processor coupled to the memory and configured to:
      receive TP traffic;
      store a plurality of ACKs at a first memory in response to the received TP traffic;
      determine a modem load for a modem;
      identify the plurality of ACKs to identify a subset of ACKs of the plurality of ACKs in response to the determined modem load satisfying a modem load threshold condition, wherein a number of unique ACKs to be included in the subset of ACKs is based on a reduction factor N, wherein the reduction factor N is adjusted based on a memory utilization of the apparatus ; and
      move the subset of ACKs from the first memory to a second memory.

21. The apparatus of claim 20, wherein, to identify, the at least one processor is configured to select all duplicate ACKs within the plurality of ACKs to be included in the subset of ACKs.

22. The apparatus of claim 20, wherein the reduction factor N is further adjusted based on at least one of a number of ACKs present in a time interval per flow or across all flows, the modem load, thermal status, or capacity of link carrying the plurality of ACKs.

23. The apparatus of claim 22, wherein the subset of ACKs comprises one ACK for every N unique ACKs of the plurality of ACKs.

24. The apparatus of claim 22, wherein the subset of ACKs comprises a last unique ACK of the plurality of ACKs and a set of earliest unique ACKs of the plurality of ACKs.

25. The apparatus of claim 20, wherein the at least one processor is further configured to determine a number of ACKs present in a time interval, wherein the at least one processor is further configured to identify in response to the number of ACKs present in the time interval satisfying an ACK count threshold condition.

26. The apparatus of claim 25, wherein the ACK count threshold condition depends on a category of the apparatus.

27. The apparatus of claim 20, wherein the at least one processor is further configured to determine the memory utilization, wherein the at least one processor is further configured to identify in response to the memory utilization satisfying a memory utilization threshold condition.

28. The apparatus of claim 20, wherein the at least one processor is further configured to determine a thermal status, wherein the at least one processor is further configured to identify in response to the thermal status satisfying a thermal level threshold condition.

29. The apparatus of claim 20, wherein the at least one processor is further configured to determine a capacity of a link transporting the plurality of ACKs, wherein the at least one processor is further configured to identify in response to the capacity of the link satisfying a capacity level threshold condition.

30. A non-transitory computer-readable medium storing computer executable code for Transport Protocol (TP) communications processing of an electronic device, the computer executable code comprising instructions for:
  receiving TP traffic;
  storing a plurality of ACKs at a first memory in response to the received TP traffic;
  determining a modem load for a modem of the electronic device;
  identifying the plurality of ACKs to identify a subset of ACKs of the plurality of ACKs in response to the determined modem load satisfying a modem load threshold condition, wherein a number of unique ACKs to be included in the subset of ACKs is based on a reduction factor N, wherein the reduction factor N is adjusted based on a memory utilization of the electronic device; and
  moving the subset of ACKs from the first memory to a second memory.

* * * * *